US011972744B2

(12) United States Patent
Cao

(10) Patent No.: US 11,972,744 B2
(45) Date of Patent: Apr. 30, 2024

(54) MOLDED PLASTIC UKULELE

(71) Applicant: Zhengliang Cao, Shanghai (CN)

(72) Inventor: Zhengliang Cao, Shanghai (CN)

(*) Notice: Subject to any disclaimer, the term of this patent is extended or adjusted under 35 U.S.C. 154(b) by 0 days.

(21) Appl. No.: 17/612,131

(22) PCT Filed: Dec. 23, 2020

(86) PCT No.: PCT/CN2020/138494
§ 371 (c)(1),
(2) Date: Nov. 17, 2021

(87) PCT Pub. No.: WO2022/048067
PCT Pub. Date: Mar. 10, 2022

(65) Prior Publication Data

US 2023/0215405 A1 Jul. 6, 2023

(30) Foreign Application Priority Data

Sep. 2, 2020 (CN) ......................... 202010908486.4

(51) Int. Cl.
*G10D 3/22* (2020.01)
*G10D 1/08* (2006.01)
*G10D 3/02* (2006.01)
*G10D 3/06* (2020.01)

(52) U.S. Cl.
CPC ................. *G10D 3/22* (2020.02); *G10D 1/08* (2013.01); *G10D 3/02* (2013.01); *G10D 3/06* (2013.01)

(58) Field of Classification Search
CPC .. G10D 3/22; G10D 1/08; G10D 3/02; G10D 3/06; G10D 1/04
See application file for complete search history.

(56) References Cited

U.S. PATENT DOCUMENTS 4,213,370 A * 7/1980 Jones ....................... G10D 3/22
984/106

* cited by examiner

*Primary Examiner* — Kimberly R Lockett
(74) *Attorney, Agent, or Firm* — Ware, Fressola, Maguire & Barber LLP

(57) ABSTRACT

A plastic ukulele has a sound board, a fretboard, a head plate and a lower half of the body integrated into a complete ukulele body. Attached to the bottom surface of the sound board are two paralleled outline reinforcing ribs which are in parallel with the outline of soundboard on the inside. The sound board has a sound hole in the upper middle part. Around the sound hole are two sets of lengthwise and widthwise paralleled reinforcing ribs. The part of sound board which is surrounded by the lower widthwise reinforcing ribs and the lower bout of outline reinforcing ribs is resonance section with a thickness of 1.0-1.4 mm only. Attached to the bottom surface of resonance section is a grid bracing structure in a one-piece molding with the sound board.

6 Claims, 9 Drawing Sheets

MOLDED PLASTIC UKULELE

FIELD OF THE INVENTION

The present invention relates to a musical instrument, and more particularly to a molded plastic ukulele.

BACKGROUND OF THE INVENTION

Ukulele, a kind of four-stringed musical instrument, smaller in size than general guitars, suitable for playing simple and cheerful music, has been very popular across the world. The conventional ukulele is made of wood, with the similar physics and structural dynamics to wooden classical guitars. Ukulele can normally be classified to 4 specifications: soprano ukulele, about 21 inches in overall length; concert ukulele, about 23-24 inches in overall length; tenor ukulele, about 25-26 inches in overall length; baritone ukulele, about 30 inches in overall length.

There is a unique wooden classical guitar which has achieved louder sound volume and richer timbre by following the principle of how drums vibrate and generate sound. The theory has the view that why a drum can generate loud sound volume is due to the super-thin drum head and particularly thick drum body. The super-thin and light weighted drum head can generate very quick and strong vibration, while the thick and sturdy drum body can hardly vibrate but merely project the sound wave with little interference.

The conventional full-size wooden classical guitars normally have sound board with thickness of about 2.8 mm, but this unique wooden classical guitar is built with a super-thin soundboard of about 1.4 mm thick which is reinforced by a wooden grid-bracing structure attached to the bottom surface of the resonance section for supporting such a thin soundboard not to collapse, crack or warp. This wooden grid-bracing structure defines that plurality of braces are diagonally intersected in parallel and equal space. Each brace has notches at junctions and are adhesive-bonded with one another precisely to a complete grid-bracing framework, which then gets glued on to the bottom surface of the resonance section. Because the notches make the braces vulnerable at junctions, so the braces in bow-shape need to be reinforced by carbon fibre fabric, the process is quite complicated and costly.

To eliminate ineffective vibration from outside of the resonance section, the soundboard part outside of the grid-bracing structure is reinforced by very thick multi-ply plywood, the back and sides of the guitar are made of plywood at a doubled thickness compared to normal guitars in imitation of drum body. The heat-pressed arch back has a better effect on projecting sound waves. This unique full-size wooden classical guitar is famed for particularly loud sound volume and quick response.

But the soundboard of wooden ukulele is much smaller in size with comparison to that of full-size wooden classical guitar, resulting in a plight on processing grid-bracing structure: the thinner wooden braces with notches at the junctions can break off easily, lack of support strength; while thick-enough wooden braces can generate less vibration which counteracts the effect of super-thin soundboard.

Wooden ukulele is more likely affected by climate, too humid or too dry weather can have wooden ukulele deformed, resulting in worse timbre. The plastic ukulele, benefiting from the plastic material which has the advantages of weather-resistance, durability, good formability fitting for mass production and all-weather playing, has come to the market with popularity.

However, most of the plastic ukuleles in the current market have a worse timbre or sound volume than conventional wooden ukuleles attributing to mediocre structural design and material rigidity. So it is in demand for a molded plastic ukulele with the advantages of good formability fitting for mass production and all-weather playing, as well as having super-thin but firmly structured resonance section to generate louder sound volume and richer timbre than those poor-to-mediocre conventional wooden ukuleles.

SUMMARY OF THE INVENTION

The primary object of the present invention is to provide a molded plastic ukulele with louder sound volume and richer timbre than those poor-to-mediocre conventional wooden ukuleles, as well as with the advantages of good formability fitting for mass-production and all-weather playing, durability by creating adequate grid-bracing-structure supported super-thin resonance section.

In order to achieve the aforesaid object, the molded plastic ukulele of the present invention comprises a sound board, a fretboard, a head plate and a lower half of the body which are injection molded parts. The sound board, fret board, head plate are integrated with the lower half of the body into a complete ukulele body through the way of the soundboard tongue, fretboard tongue, head plate tongue being sequentially mounted onto the corresponding grooves of the lower half of the body.

Attached to the bottom surface of the soundboard are two paralleled outline reinforcing ribs which are in parallel with the outline of the soundboard on the inside. Preferably, the sound board has a sound hole in the upper middle part. Around the sound hole are two sets of lengthwise and widthwise paralleled reinforcing ribs. The part of the sound board which is surrounded by the lower widthwise reinforcing ribs and the lower bout of outline reinforcing ribs is the resonance section with a thickness of 1.0-1.4 mm only. Attached to the bottom surface of the resonance section is a grid-bracing structure in a one-piece molding with sound board. The grid braces diagonally intersect in parallel and equal space.

Preferably, the lengthwise reinforcing ribs and widthwise reinforcing ribs vertically intersect and their extending ends connecting with the outline reinforcing ribs and grid-braces form an entire reinforced supporting framework. The configuration of outline reinforcing ribs, lengthwise reinforcing ribs, widthwise reinforcing ribs can also effectively prevent the vibration of the resonance section from conducting to other parts, reducing the consumption of vibrating energy.

Theoretically, thinner resonance sections can generate stronger vibration and faster response, along with louder sound volume. However, the super-thin sound board can likely get collapsed, cracked or warped due to the persistent strings tension and weaker self-rigidity. So different from other types of bracing structure, a grid-bracing structure is attached to the bottom surface of a super-thin resonance section to afford more balanced and overall support by dividing it to grids with substantially identical area and shape. Being a one-piece molding with sound board and without notches at junctions, the braces are of minimized thickness and weight, adequate supporting strength and toughness, good formability, which has solved the processing problem of conventional wooden ukuleles. With the adequate support by the grid braces, the thickness of the resonance section is made to as thin as 1.0-1.4 mm to generate louder sound volume and richer timbre compared to those poor-to-mediocre conventional wooden ukuleles.

Preferably, the grid braces diagonally intersect in parallel and equal space, the amount of the braces ranges 5×5, 6×6, 7×7, 8×8, 9×9, or 10×10.

Preferably, to minimize the weight, the grid braces are all in bow-shape which has the highest tops in the center and slope downward to two ends, with the thickness ranging from 0.7 to 1.4 mm, and the height ranging from 1.0 to 6.0 mm.

Preferably, the intersecting points and the tops of grid braces form a cambered surface for the purpose of easy processing and structural durability.

Preferably, two widthwise short braces are separately configured to the left and right side of the grid bracing structure, and particularly in line with the intersecting point of the two longest braces. The two widthwise short braces are created for the purpose of eliminating some wolf notes.

The present invention has achieved richer timbre and louder sound volume by creating the adequate grid-bracing-structure supported super-thin resonance section.

Preferably, the sound board outside of the resonance section has a thickness of at least 2.5 mm. By thickening the sound board outside of the resonance section, the ineffective vibration and interference from the outside of the resonance section gets further reduction.

Preferably, the lower half of the body includes the round back, neck and bottom panel of head. The round back is a parabolic shape with a thickness of more than 3.1 mm.

Plastic material has the physical properties of high elastic modulus and good formability, so the ukulele back and sides can be made to a one piece molding of round back in parabolic shape, which can focus and reflect sound waves much better than conventional flat back wooden ukuleles. Meanwhile, the thickness of the round back is thickened to 3.1 mm and up in imitation of a drum body, for reducing the ineffective vibration.

Preferably, the sound board, fret board, head plate and the lower half of the body are made up of 10-30% glass fibre reinforced polycarbonate material which combines the physical properties of better toughness, impact-resistance, thermal endurance of polycarbonate with the high rigidity, less molding shrinkage rate of glass fibre. The molded plastic ukulele of the present invention has a richer timbre, better structural rigidity and stability.

Preferably, on the bottom surface of the soundboard, fret board, head plate, close to the inside edges in parallel with the outlines are sound board tongue, fretboard tongue, head plate tongue, the sound board tongue is to the outside of the outline reinforcing ribs. Corresponding to sound board tongue, fretboard tongue, head plate tongue is the concave-inward grooves on the upper edges of the lower half of the body. The sound board, fret board, head plate are integrated with the lower half of the body into a complete ukulele body through the way of the soundboard tongue, fretboard tongue, head plate tongue being sequentially mounted onto the grooves of the lower half of the body.

Preferably, the sound board tongue, fretboard tongue, head plate tongue are ultrasonic welding ribs, the tongue-and-groove joints are fused together by ultrasonic welding.

According to the above-described technical solution, the present invention has the following effects: a molded plastic ukulele is provided having not only the advantages of louder sound volume, richer timbre by comparison to those poor-to-mediocre conventional wooden ukuleles, but also of simplified process fitting for mass production and all-weather playing, lower production cost by creating the super-thin but firmly-structured resonance section which is not able to accomplish by prior art.

BRIEF DESCRIPTION OF THE DRAWINGS

The accompanying drawings are part of the description for the purpose of further illustration to the present invention with the incorporation of the embodiment, however, it should not be a limit to the present invention.

In the drawings.

REFERENCE NUMBERS IN THE DRAWINGS

1—lower half of the body
11—grooves of the lower half of the body
12—round back; 13—Neck; 14—bottom panel of head;
2—sound board;
21—tongue of sound board; 22—outline reinforcing ribs;
23—sound hole;
241, 242—left, right lengthwise reinforcing ribs;
251, 252—upper, lower widthwise reinforcing ribs;
26—resonance section;
3—fret board;
31—tongue of fret board;
4—head plate;
41—tongue of head plate;
5—grid braces;
51—intersecting points of grid braces
521,522—left, right widthwise short braces

DETAILED DESCRIPTION OF THE INVENTION

Embodiment of the present invention will now be described, by way of example only, with reference to the accompanying drawings.

Figure 1:
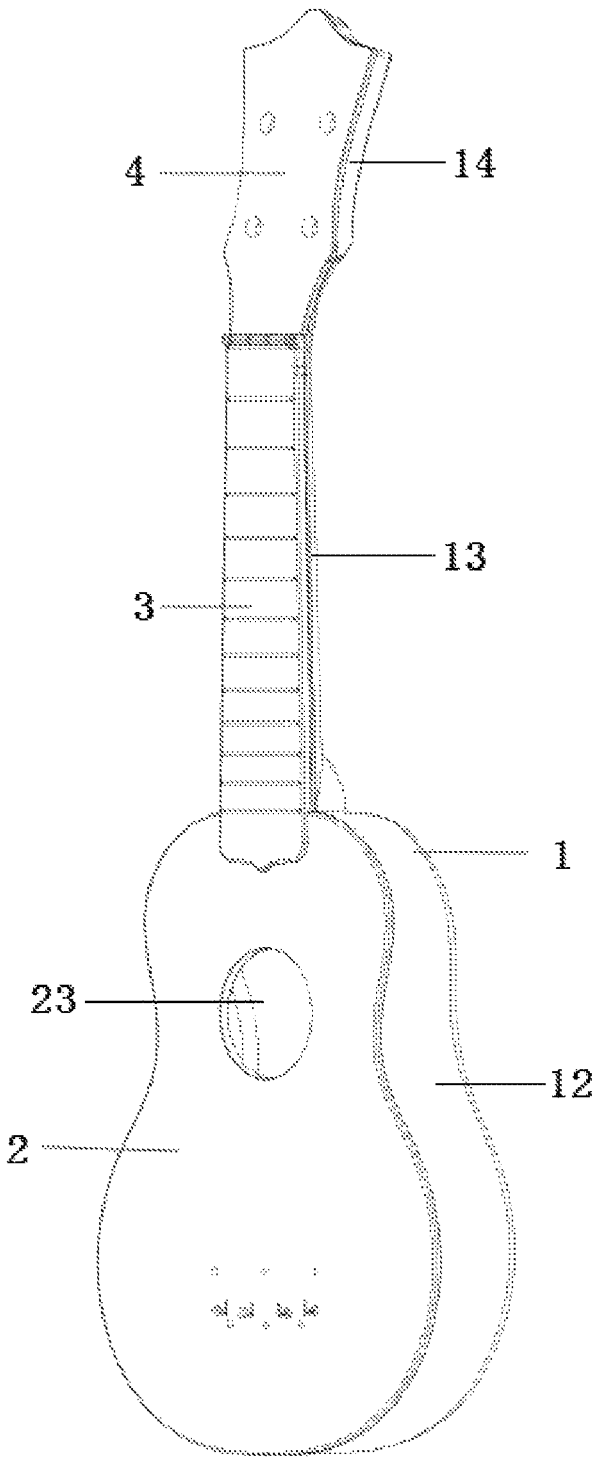
FIG.1 is a front perspective view of the present invention.
Figure 2:
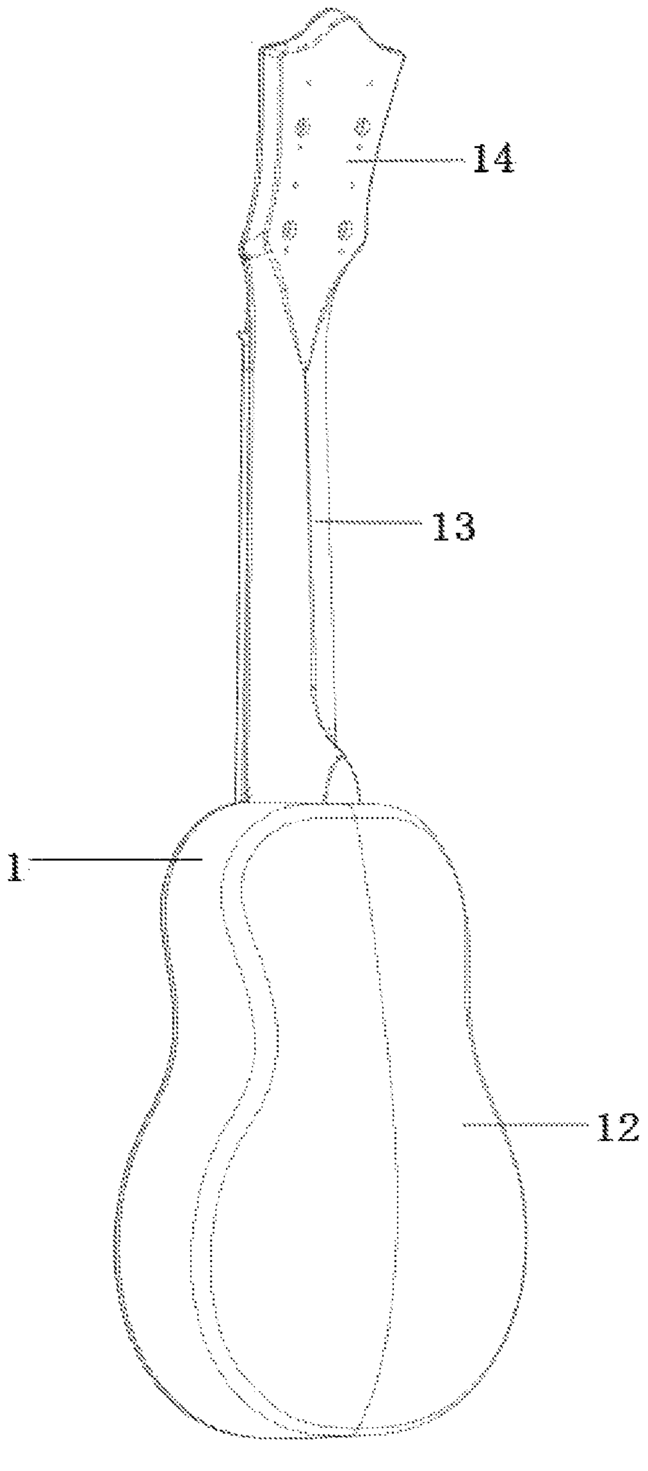
FIG.2 is a back perspective view of the present invention.
Figure 3:
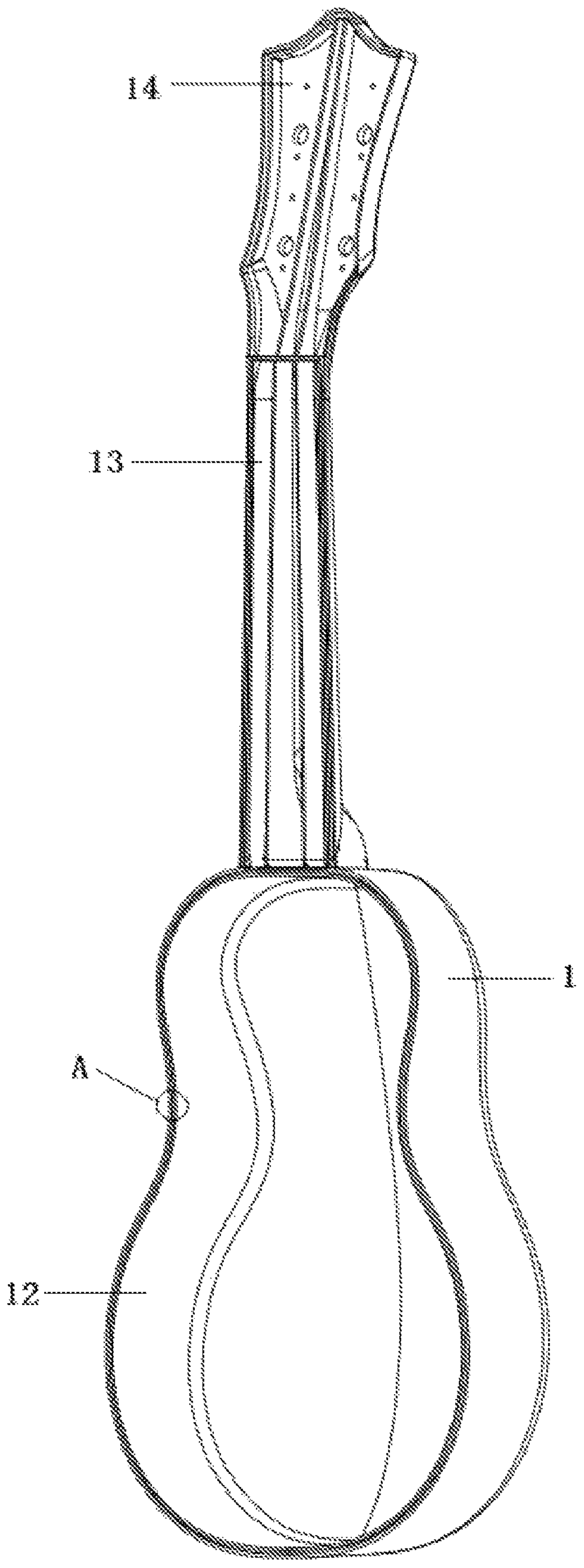
FIG.3 is a front perspective view of the lower half of the body.
Figure 4:
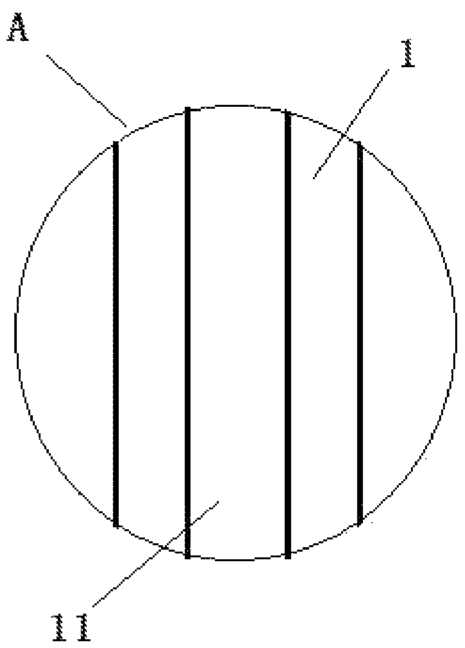
FIG.4 is an enlarged sectional detail view A of FIG.3.
Figure 5:
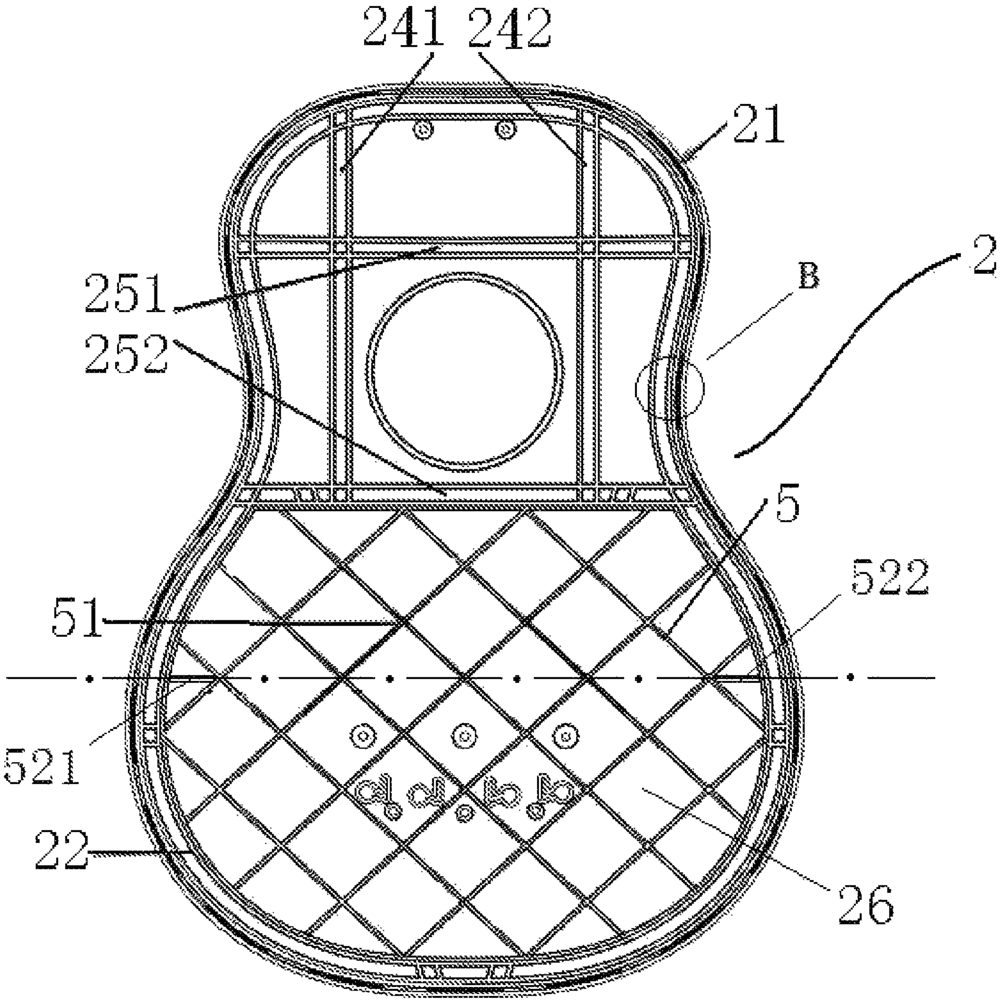
FIG.5 is a back schematic view of the sound board.
Figure 6:
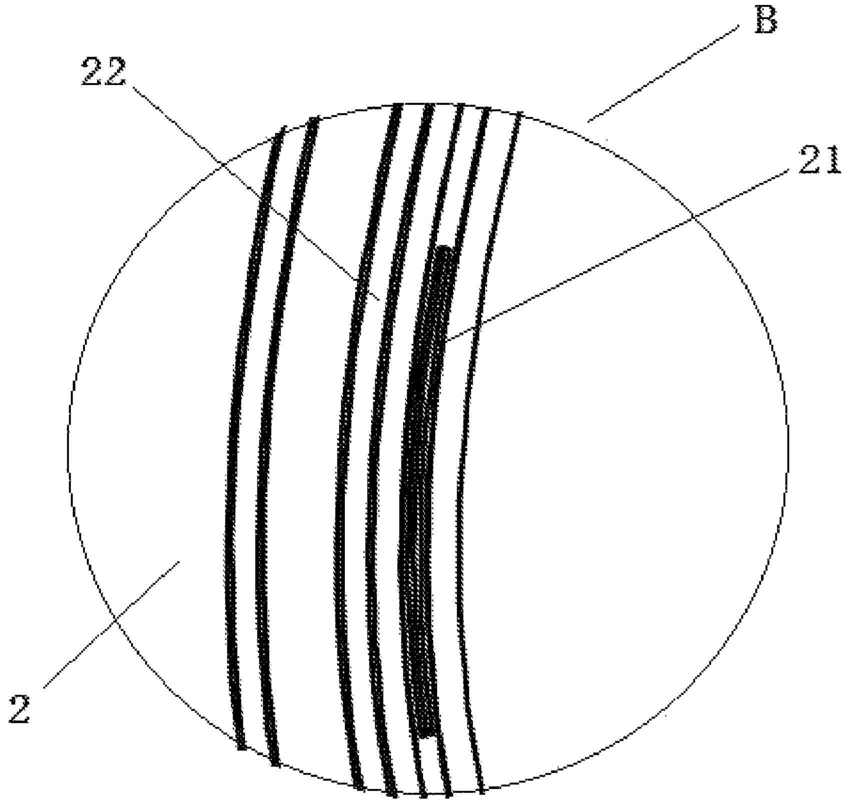
FIG.6 is an enlarged sectional detail view B of FIG.5.
Figure 7:
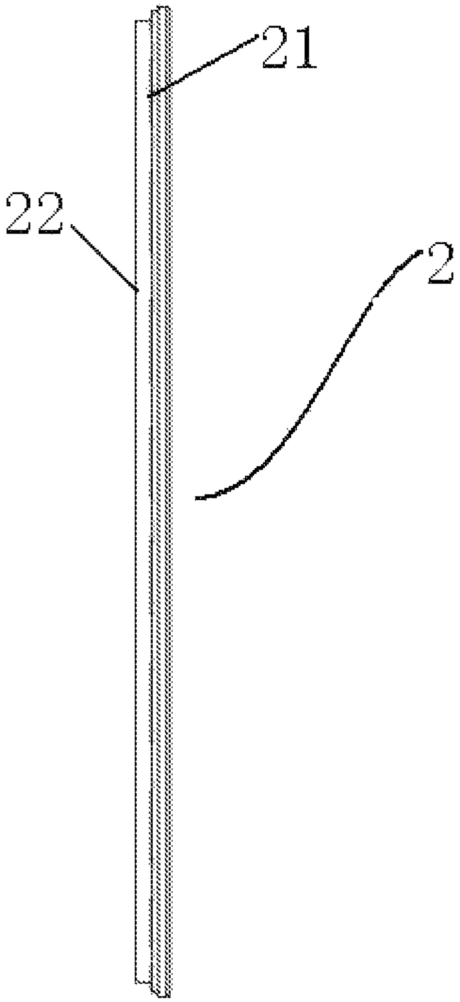
FIG.7 is a side schematic view of the sound board.
Figure 8:
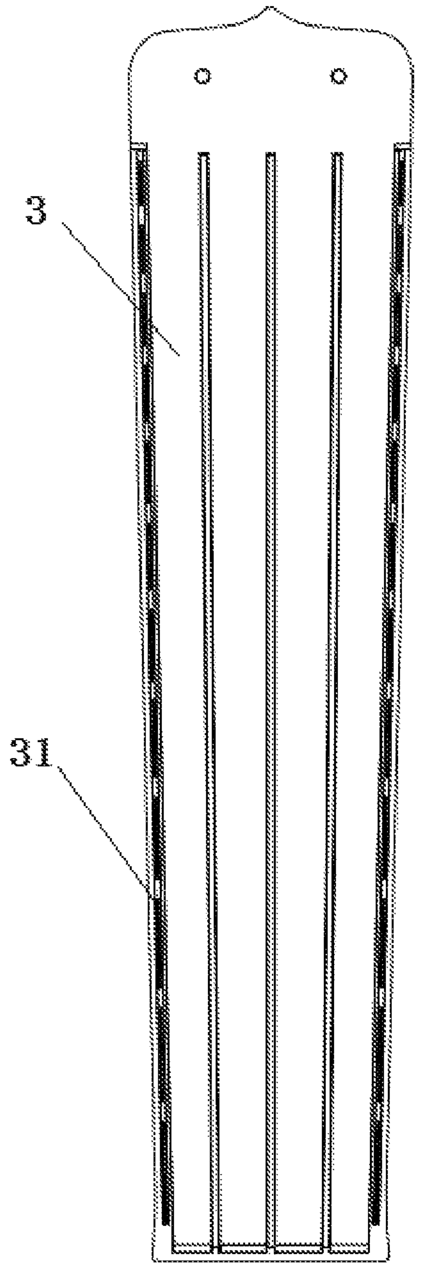
FIG.8 is a back schematic view of the fretboard.
Figure 9:
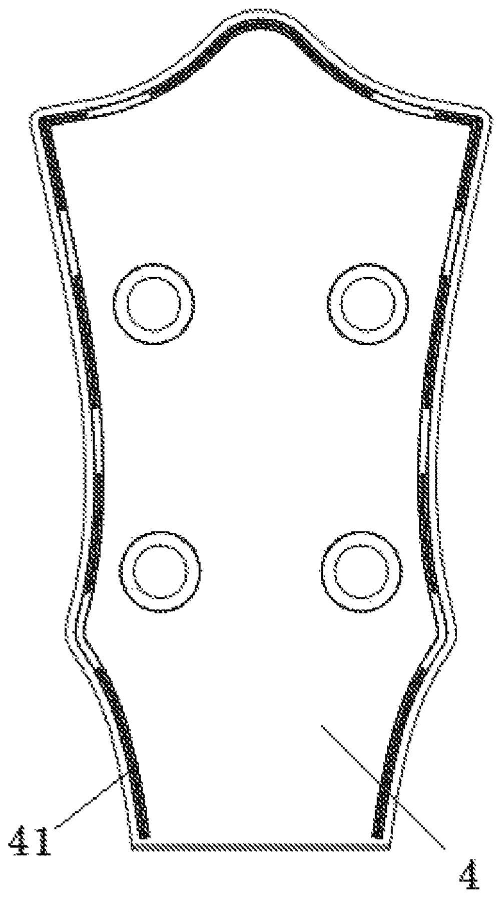
FIG.9 is a back schematic view of the head plate.

In a preferred embodiment of the present invention (FIG.1-FIG.9), the molded plastic ukulele comprises a soundboard 2, a fretboard 3, a head plate 4 and a lower half of the body 1, which are made up of 10-30% glass fibre reinforced polycarbonate by injection molding. The lower half of the body includes a round back 12, a neck 13 and a bottom panel of head 14. The round back 12 is in a parabolic shape of thicker center and thinner sides with the thickness of 3.1 mm around the thinnest sides, and 3.9 mm in the thickest center part. Attached to the bottom surface of the soundboard 2 are two paralleled outline reinforcing ribs 22 which are in parallel with the outline of the soundboard on the inside. The sound board 2 has a sound hole 23 in the upper middle part. Around the sound hole 23 are two sets of left and right lengthwise paralleled reinforcing ribs 241, 242 and two sets of upper and lower widthwise paralleled reinforcing ribs 251, 252, their extending ends connect with the outline reinforcing ribs 22. The part of sound board which is surrounded by the lower widthwise reinforcing ribs and the lower bout of outline reinforcing ribs is resonance section 26 with a thickness of 1.2 mm, while the part of sound board surrounded by the lower widthwise reinforcing ribs and the upper bout of outline reinforcing ribs have a thickness of 2.6 mm. Attached to the bottom surface of the resonance section is a grid-bracing structure 5 comprising 6x6 diagonally intersected braces in parallel and equal space.

The grid braces 5 are all in bow-shape which have the highest tops in the center and slope downward to two ends. The thickness on the bottom of each brace is 1.1 mm, the height at the lowest two ends is 1.4 mm, and the intersecting point of the two longest braces has a height of 4.9 mm. Two widthwise short braces 521,522 are separately configured to the left and right side of the grid-bracing structure, and particularly in line with the intersecting point of the two longest braces.

All the intersecting points and the tops of grid braces 5 form a cambered surface. The grid braces 5 is a one-piece molding with the sound board 2.

On the bottom surface of the soundboard 2, fretboard 3, head plate 4, close to the inside edges in parallel with the outlines are sound board tongue 21, fretboard tongue 31, head plate tongue 41, the sound board tongue 21 is to the outside of the outline reinforcing ribs. Corresponding to the sound board tongue 21, fretboard tongue 31, head plate tongue 41 are the concave-inward grooves 11 on the upper edges of the lower half of the body 1. The sound board 2, fretboard 3, head plate 4 are integrated with the lower half of the body 1 into a complete ukulele body through the way of the soundboard tongue 21, fretboard tongue 31, head plate tongue 41 being sequentially mounted on to the grooves 11 of the lower half of the body. The sound board tongue 21, fretboard tongue 31, head plate tongue 41 are ultrasonic welding ribs. The tongue-and-groove joints are fused together by ultrasonic welding.

The preferred embodiment refers to soprano ukulele, although another three specifications of ukuleles including concert, tenor, baritone sizes with different dimensions and different grid braces permutations, they have similar shape and internal structure as the soprano ukulele of the present invention, so the details are not described herein.

Although a preferred embodiment of the present invention has been described herein in detail, it will be understood by those skilled in the art that variations and modifications may be effected without departing from the spirit and scope of the novel concepts of this invention. Such variations and modifications are considered to fall in with the scope of the appended claims.

What is claimed is:

1. A molded plastic ukulele, comprising a body having an upper half and a lower half, the upper half of the body having a neck, a fretboard, and a head plate, the lower half of the body having a sound board and a back plate, wherein the sound board has a sound hole and an inner side facing the back plate, the inner side of the sound board having an outline reinforcing rib, a lower section and an upper section, and wherein the upper section comprises the sound hole, two widthwise reinforcing ribs and two lengthwise reinforcing ribs separated by the sound hole, the lengthwise reinforcing ribs substantially parallel to the fretboard, and the lower section comprises two shorter tuning ribs, a first group of longer parallel tuning ribs and a second group of longer parallel tuning ribs, and wherein each of the longer tuning ribs has two rib end, at least one of the rib ends connected to the outline reinforcing rib, each of the longer tuning rib having a bow shape profile with two end heights and a midpoint height greater than the end height, the first group of longer tuning ribs configured to intersect with the second group of longer tuning ribs at a plurality of intersecting points, such that the intersecting points form a plurality of widthwise-aligned point groups, each of the widthwise-aligned point groups having two outer intersecting points, and wherein each of the two shorter tuning ribs is connected to the outline reinforcing rib and to one of the two outer intersecting points of one of the widthwise-align point groups.

2. The molded plastic ukulele as claimed in claim 1, wherein each of the first group of longer tuning ribs and the second group of longer tuning ribs has a number of ribs, and the number range from 5 to 10.

3. The molded plastic ukulele as claimed in claim 1, wherein each of the longer tuning ribs has a thickness of 0.7 to 1.4 mm, and the midpoint height ranges from 1.0 to 6.0 mm.

4. The molded plastic ukulele as claimed in claim 1, wherein the back plate has a parabolic shape with a thickness greater than 3.1 mm.

5. The molded plastic ukulele as claimed in claim 1, wherein the sound board, the fretboard, the head plate and the lower half of the body are made up of 10-30% glass fibre reinforced polycarbonate material.

6. The molded plastic ukulele as claimed in claim 1, further comprises ultrasound-welded tongue-and-groove joints for connecting the soundboard, the fretboard, the head plate and the lower half of the body.

* * * * *